(12) United States Patent
Lynch

(10) Patent No.: US 9,230,454 B1
(45) Date of Patent: Jan. 5, 2016

(54) MAP FOLDED TO EXPOSE STAGGERED EDGES

(71) Applicant: Peter M. Lynch, Toronto (CA)

(72) Inventor: Peter M. Lynch, Toronto (CA)

(*) Notice: Subject to any disclaimer, the term of this patent is extended or adjusted under 35 U.S.C. 154(b) by 0 days.

(21) Appl. No.: 14/765,981

(22) PCT Filed: Feb. 19, 2013

(86) PCT No.: PCT/CA2013/050129
§ 371 (c)(1),
(2) Date: Aug. 5, 2015

(87) PCT Pub. No.: WO2014/127447
PCT Pub. Date: Aug. 28, 2014

(51) Int. Cl.
*G09B 29/04* (2006.01)
*B42D 15/00* (2006.01)
*G09B 29/00* (2006.01)

(52) U.S. Cl.
CPC .............. *G09B 29/04* (2013.01); *B42D 15/008* (2013.01); *G09B 29/003* (2013.01)

(58) Field of Classification Search
CPC ..... B42D 15/008; G09B 29/04; G09B 29/003
USPC ................................ 283/34, 35, 37, 41; 281/5
See application file for complete search history.

(56) References Cited

U.S. PATENT DOCUMENTS

| | | | | |
|---|---|---|---|---|
| 2,118,964 A | * | 5/1938 | Bonnaire | G09B 29/04 |
| | | | | 281/5 |
| 2,179,172 A | | 7/1939 | Bonnaire | |
| 4,348,038 A | * | 9/1982 | Lynch | G09B 29/04 |
| | | | | 283/34 |
| 6,045,158 A | * | 4/2000 | Bergstresser | B42D 1/006 |
| | | | | 281/5 |

FOREIGN PATENT DOCUMENTS

| | | | | |
|---|---|---|---|---|
| CA | 1158685 | | 12/1983 | |
| CH | 359783 A | * | 4/1906 | ............. G09B 29/04 |

(Continued)

OTHER PUBLICATIONS

International Search Report for Int. App. No. PCT/CA2013/050129, completed Sep. 30, 2013.

*Primary Examiner* — Kyle Grabowski
(74) *Attorney, Agent, or Firm* — McDonnell Boehnen Hulbert & Berghoff LLP

(57) ABSTRACT

A map including a plurality of sheets having map pictorial sections printed on each sheet; the plurality of sheets including an outermost sheet and an innermost sheet; and at least a first inner sheet and a second inner sheet positioned between the outermost sheet and the innermost sheet, the first inner sheet positioned between the outermost sheet and the second inner sheet; each of the plurality of sheets having first, second and third fold lines such that each of the plurality of sheets includes four panels; the first panel defined by a first side edge and the first fold line, the second panel defined by the first fold line and the second fold line, the third panel defined by the second fold line and the third fold line, and the fourth panel defined by the third fold line and a second side edge; wherein each the sheet is folded along the second fold line such that the third panel is positioned atop the second panel with the third fold line proximate the first fold line; the fourth panel positioned atop the third panel as the sheet is folded along the third fold line; the first panel positioned atop the fourth panel; and wherein the outermost sheet has an overall length less than the first inner sheet, which has an overall length less than the second inner sheet, which has an overall length less than the innermost sheet, such that when assembled the first panels form a first staggered edge and each of the fourth panels form a second staggered edge.

16 Claims, 6 Drawing Sheets

(56) References Cited

FOREIGN PATENT DOCUMENTS

| DE | 613532 C    | * | 5/1935  | ............ G09B 29/04 |
| DE | 3125369 A1  | * | 5/1982  | ............ B42C 19/02 |
| FR | 54322 E     | * | 12/1948 | ............ G09B 29/04 |
| FR | 1019491 A   | * | 1/1953  | ............ G09B 29/04 |
| GB | 2119147 A   | * | 11/1983 | ............ G09B 29/04 |
| NL | 0329861 A1  | * | 8/1989  | ............ G09B 29/04 |

* cited by examiner

MAP FOLDED TO EXPOSE STAGGERED EDGES

CROSS REFERENCE TO RELATED APPLICATIONS

The present application is a U.S. National Phase Application pursuant to 35 U.S.C. §371 of International Application No. PCT/CA2013/050129 filed Feb. 19, 2013. The entire disclosure content of this application is herewith incorporated by reference into the present application.

FIELD OF THE INVENTION

The present invention relates to the field of cartography, and in particular relates to an improved map and assembly thereof.

BACKGROUND OF THE INVENTION

The invention relates to maps made of paper, cardboard, or similar materials that are intended to be carried and handled by a user during the course of travel, for example. Various types of maps for this purpose are known in the art, and have seen widespread use for many year now. These include maps printed on a single sheet of paper that folds and unfolds to reveal various sections of the map, and maps bound into book for with various areas being mapped shown on different pages. With the former, it is well known that such maps are often times difficult to handle while travelling and once unfolded can be problematic to fold back to their original position. Thus, after repeated fold and unfold cycles, the map tends to get damaged and wear on the map takes its toll. With the latter, the user is often required to turn between numerous pages to locate a position on the map and often times, reference to various pages must be made. Thus, book-style maps can be confusing and difficult to hand as well.

Various modifications and improvements have been attempted over the years to improve upon these types of maps. However, some prior art maps prove expensive to manufacture and/or assemble, while others do not lend themselves to ease of use and carry while travelling.

One prior art map that attempted to address these problems was shown in U.S. Pat. No. 4,348,038 to Peter Lynch—the inventor of the present invention. The '038 Patent discloses an improved map arranged from a number of folded sheets, that form a variation on the book style of maps. While the '038 map provides significant improvements over the prior art, its cost of manufacture prohibited widespread use.

Other prior art maps make it difficult to readily locate landmarks, or to provide detail portions of sections of the map while providing ease of use and handling of the map itself.

Accordingly, there is a need in the art for an improved map that addresses one or more of the aforementioned problems with the prior art.

SUMMARY OF THE INVENTION

In accordance with the present invention there is provided a map including a plurality of sheets having map pictorial sections printed on each sheet; the plurality of sheets including an outermost sheet and an innermost sheet; and at least a first inner sheet and a second inner sheet positioned between the outermost sheet and the innermost sheet, the first inner sheet positioned between the outermost sheet and the second inner sheet; each of the plurality of sheets having first, second and third fold lines such that each of the plurality of sheets includes four panels; the first panel defined by a first side edge and the first fold line, the second panel defined by the first fold line and the second fold line, the third panel defined by the second fold line and the third fold line, and the fourth panel defined by the third fold line and a second side edge; wherein each the sheet is folded along the second fold line such that the third panel is positioned atop the second panel with the third fold line proximate the first fold line; the fourth panel positioned atop the third panel as the sheet is folded along the third fold line; the first panel positioned atop the fourth panel; and wherein the outermost sheet has an overall length less than the first inner sheet, which has an overall length less than the second inner sheet, which has an overall length less than the innermost sheet, such that when assembled the first panels form a first staggered edge and each of the fourth panels form a second staggered edge.

According to one aspect of the invention, each the second and third panels are substantially identical in size.

According to another aspect of the invention, the first staggered edge is staggered such that the first edge and a portion of the sheet proximate thereto of each of the plurality of sheets faces towards a top portion of the map, and is visible from the top.

According to another aspect of the invention, the second staggered edge is staggered such that the second edge and another portion of the sheet proximate thereto of each of the plurality of sheets faces towards a bottom portion of the map and is visible from the bottom.

According to another aspect of the invention, each the visible first edge and the portion of the sheet proximate thereto contains grid reference indicia.

According to another aspect of the invention, each the visible second edge and the another portion of the sheet proximate thereto contains grid reference indicia.

According to another aspect of the invention, a protective cover is provided surrounding the outermost sheet, and extending over each of the staggered edge portions.

According to another aspect of the invention, the protective cover further includes a pocket portion into which the map can be folded in half and secured in a closed manner.

According to a second embodiment of the invention, there is provided a method for assembling a map including providing a plurality of sheets having map pictorial sections printed on each sheet; the plurality of sheets including an outermost sheet and an innermost sheet; and at least a first inner sheet and a second inner sheet positioned between the outermost sheet and the innermost sheet, the first inner sheet positioned between the outermost sheet and the second inner sheet; folding each of the plurality of sheets along first, second and third fold lines such that each of the plurality of sheets includes four panels; the first panel defined by a first side edge and the first fold line, the second panel defined by the first fold line and the second fold line, the third panel defined by the second fold line and the third fold line, and the fourth panel defined by the third fold line and a second side edge; folding each the sheet along the second fold line such that the third panel is positioned atop the second panel with the third fold line proximate the first fold line; folding each sheet along the third fold line such that the fourth panel positioned atop the third panel and the first panel positioned atop the fourth panel; wherein the outermost sheet has an overall length less than the first inner sheet, which has an overall length less than the second inner sheet, which has an overall length less than the innermost sheet, such that when assembled the first panels form a first staggered edge and each of the fourth panels form a second staggered edge.

According to one aspect of this embodiment, each of the second and third panels are substantially identical in size.

According to another aspect of the invention, the first staggered edge is staggered such that the first edge and a portion of the sheet proximate thereto of each of the plurality of sheets faces towards a top portion of the map, and is visible from the top.

According to another aspect of the invention, the second staggered edge is staggered such that the second edge and another portion of the sheet proximate thereto of each of the plurality of sheets faces towards a bottom portion of the map and is visible from the bottom.

According to another aspect of the invention, each the visible first edge and the portion of the sheet proximate thereto contains grid reference indicia.

According to another aspect of the invention, each the visible second edge and the another portion of the sheet proximate thereto contains grid reference indicia.

According to another aspect of the invention, the method further includes providing a protective cover surrounding the outermost sheet, and extending over each of the staggered edge portions.

According to another aspect of the invention, the protective cover further includes a pocket portion into which the map can be folded in half and secured in a closed manner.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION

Figure 1:
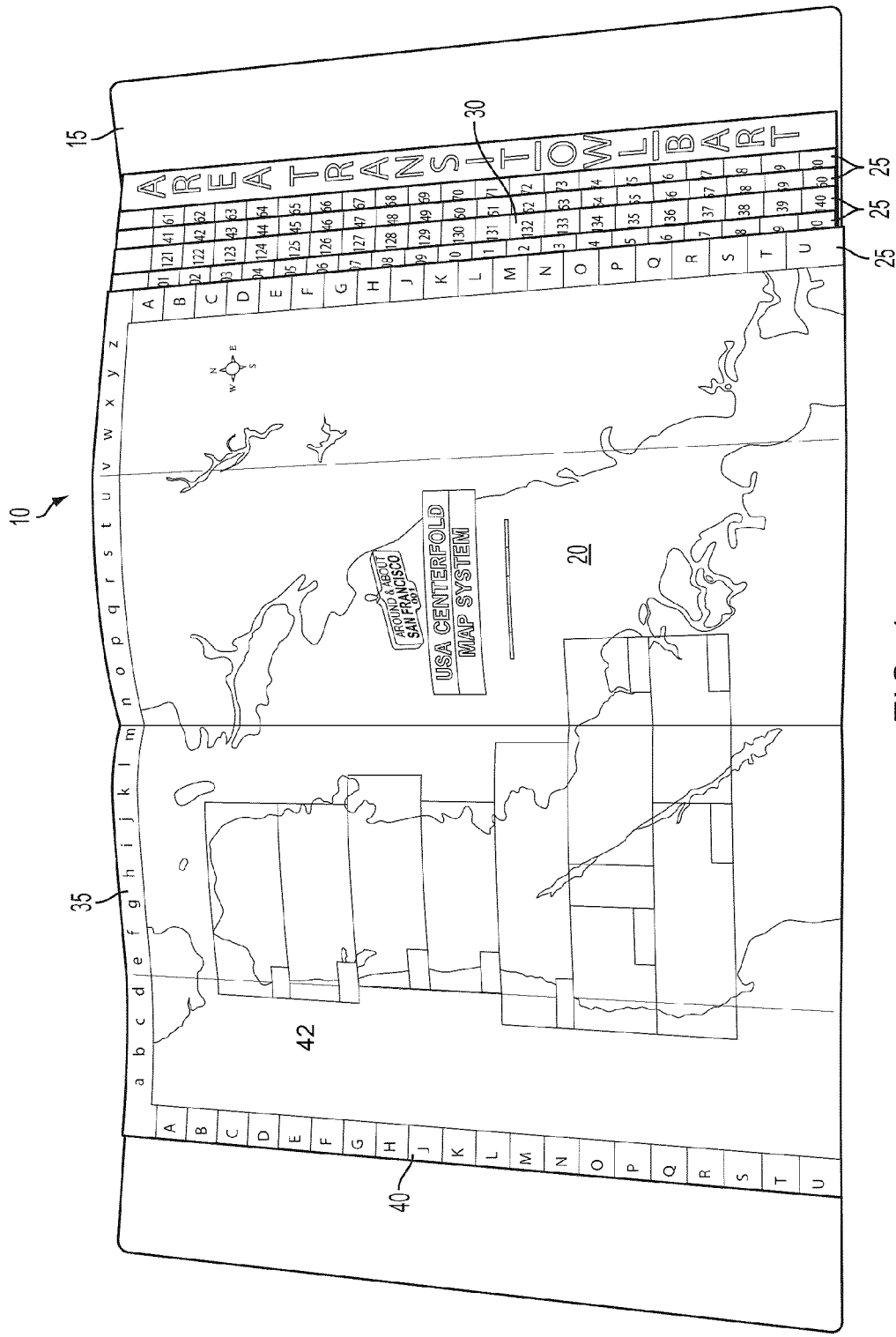
FIG. 1 shows a top view of a map according to one embodiment of the invention.

Referring now to FIG. 1, there is shown a generic top view of a map 10 according to the invention, which has been opened up to an arbitrary page. The map 10 includes a relatively stiff cover 15, which optionally includes a pocket portion (described below) into which the map 10 can be folded when not in use. The cover 15 protects the inner pages of the map 10. As illustrated in FIG. 1, the map 10 includes a geographical area 20, which is preferably contained on a central page of the map 10. Each of the pages 25 of the map 10 may include adjacent portions of the geographical area 20, or alternatively, detail views of various portions of the geographical area 20. As seen, each page 25 has a border that is offset from an adjacent sheet, effectively staggering the pages 25 so that a multi-level grid reference 30 can be provided. Reference can thus be made to lower case letters 35, upper case letters 40, as well as to the staggered numbered portions 30. Depending on the number of pages 25 in the map 10, the staggered numbered portions 30 may include reference of upwards of 100 numbers. When combined with the letters 35, this permits for fine detail in locating streets or other landmarks on the map. The invention provides for large amounts of detail to be shown on each page of the map 10, as will become apparent from the details that follow. In addition, the pages 25 are easy to handle, and portions of the reference numerals and letters are visible on every page turn. These details and other advantages will become apparent in view of the description that follows.

Figure 2:
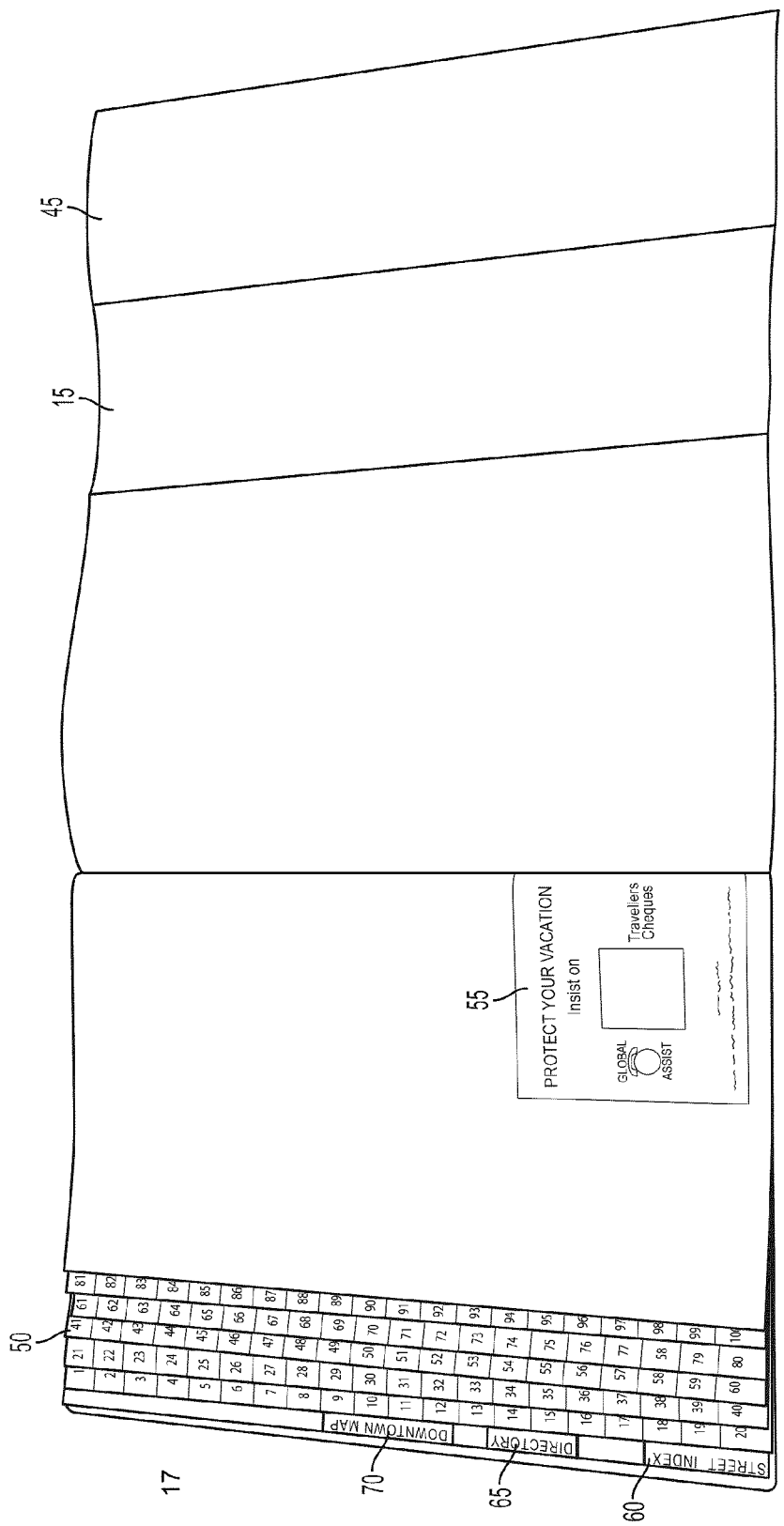
FIG. 2 shows a top view of another page of the map according to the embodiment of FIG. 1.

FIG. 2 shows the map of FIG. 1 having been turned to the last page in the book. The cover 15 is seen in more detail here, and includes extension portion 45. Extension portion 45 is preferably folded over to form a pocket into which the remainder of the map can be folded during travel. This permits the map 10 to be kept in a closed position, without pages opening up or becoming prone to unnecessary damage or wear. As shown, this last page still provides access to a staggered numbered portion 50 for identifying pages of the map, and may be used to position advertising 55, as illustrated. Various sections of the map 10 may also be labeled here, such as the Street Index 60, a Directory 65 and a Downtown Map 70. These tabs provide access to pages in the map that are often accessed, and where useful information may be found. In addition, directory information could also be printed on this last page, or provided as an insert to the map itself. As will be so far apparent, the staggered numbered portion 50 is visible on every page of the map, and provides for an identification of numbered page portions without having to turn pages and actively seek out these numbers.

Figure 3:
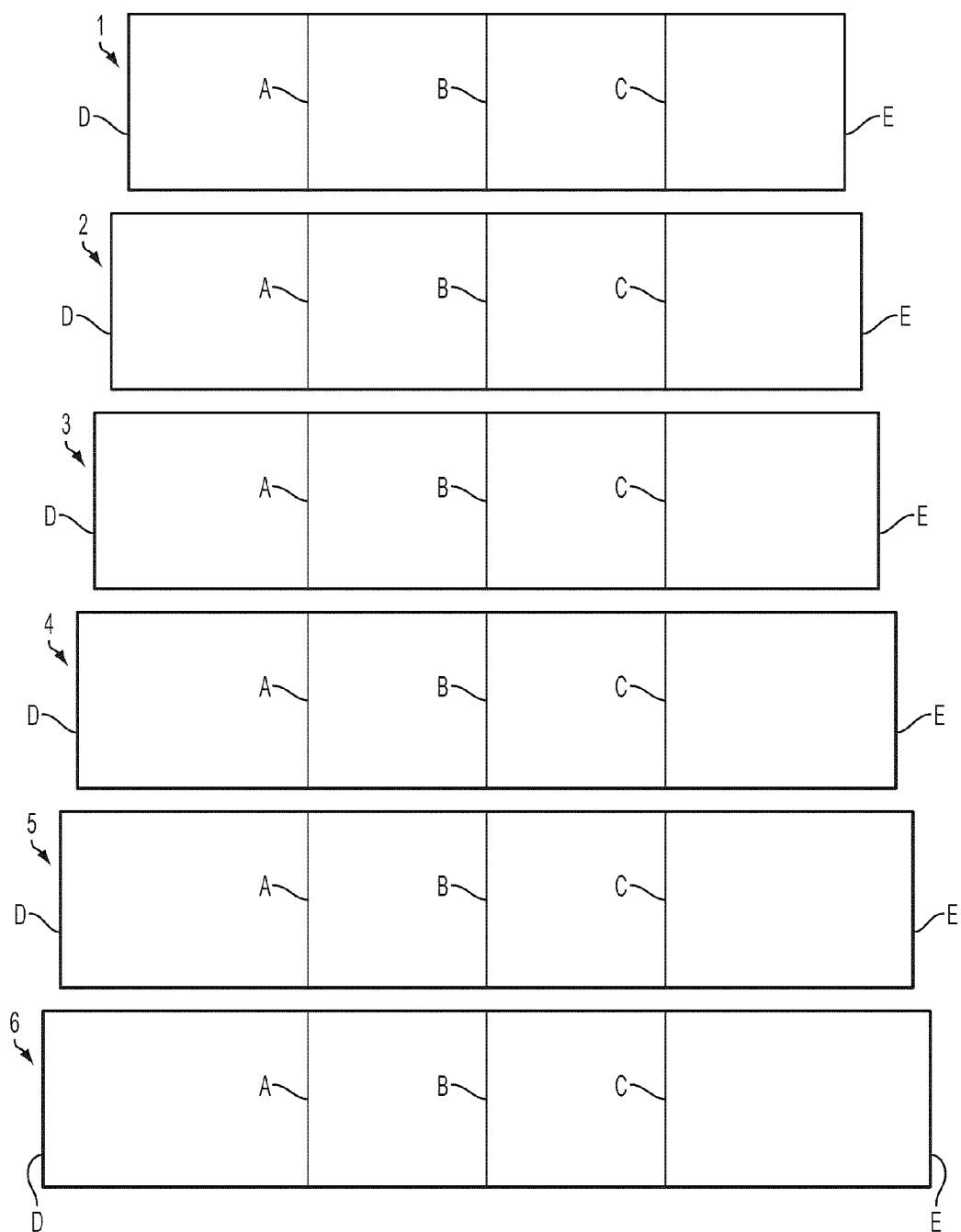
FIG. 3 is a top plan view of each sheet in a representative six-sheet map.
Figure 4:
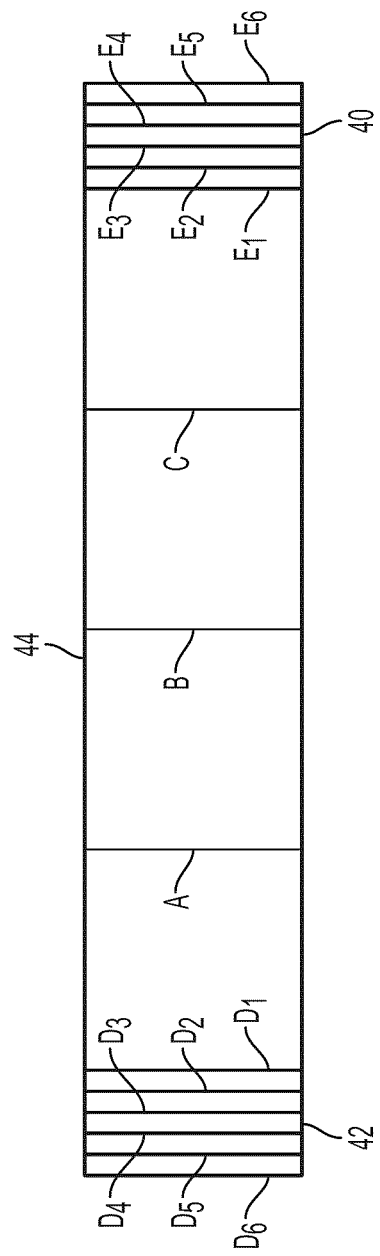
FIG. 4 is a top view of the sheets of FIG. 3 atop one another.

As shown in some detail in FIG. 3, the map according to the invention includes a plurality of sheets, labeled as sheets 1-6, each having map pictorial sections printed thereon. For ease of understanding, these pictorial sections are not shown, but could typically include a detail section from any of the identified detail sections in FIG. 1. The map is formed from a plurality of sheets including an outermost sheet 1 and an innermost sheet 6. At least a first inner sheet 2 and a second inner sheet 5 positioned between the outermost sheet 1 and the innermost sheet 6 are also provided. Additional inner sheets 3 and 4 are also illustrated. The invention is not limited to the number of sheets used to form the map.

Each of the plurality of sheets includes first (A), second (B) and third (C) fold lines that define four panels on each sheet. The panels will be hereinafter referred to as being bounded by their respective edges. Thus, the four panels are DA, AB, BC and CE on each sheet. The first panel DA is defined by a first side edge D and the first fold line A. The second panel AB is defined by the first fold line A and the second fold line B. The third panel BC is defined by the second fold line B and the third fold line C. Finally, the fourth panel CE is defined by the third fold line C and by a second side edge E.

Figure 5:
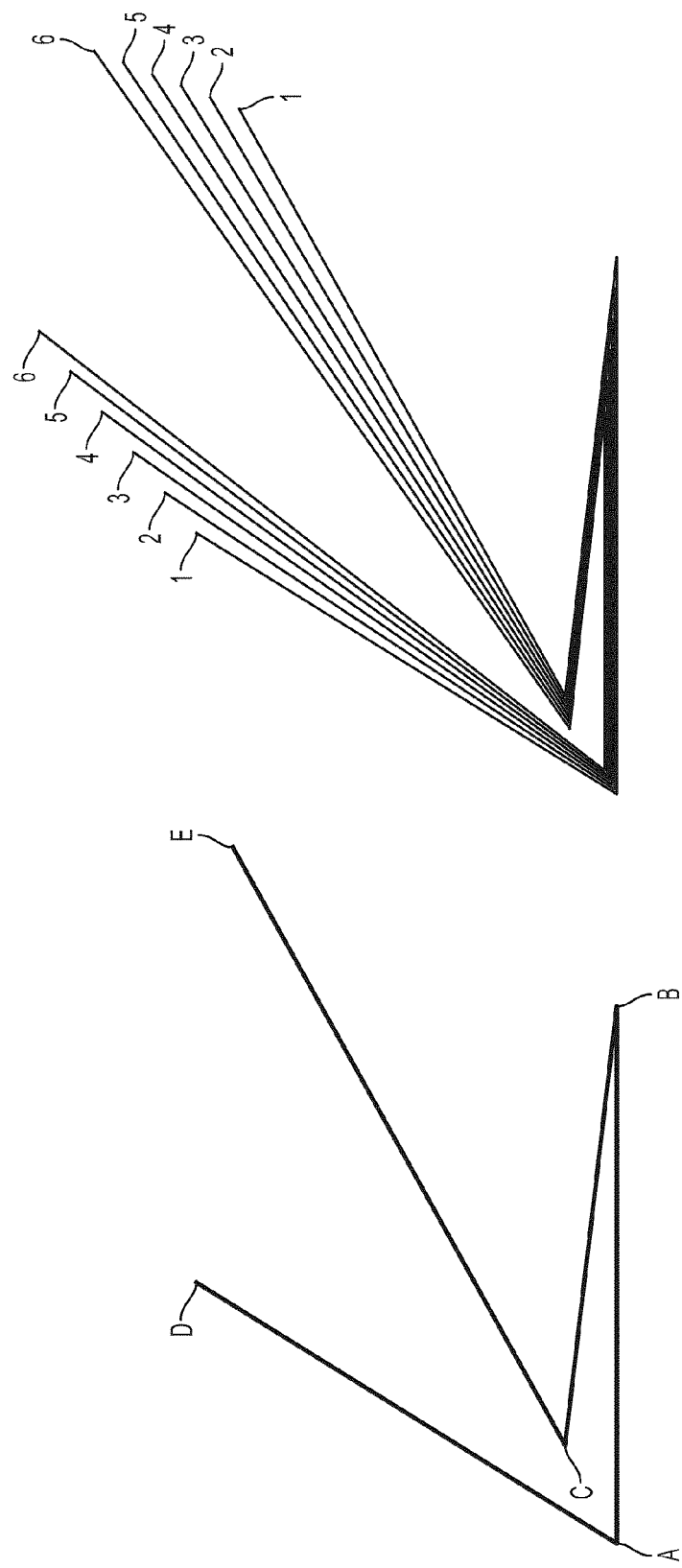
FIGS. 5A and 5B are side views of the assembled map without a cover.

Each the sheet is folded along the second fold line B such that the third panel BC is positioned atop the second panel AB with the third fold line C positioned proximate the first fold line A. Next, the fourth panel CE is positioned atop the third panel BC as the sheet is folded along the third fold line C. The first panel DA is positioned atop the fourth panel CE. This arrangement is more clearly shown in FIGS. 5A, 5B and 6. Also shown in FIG. 3, the outermost sheet a has an overall length less than the first inner sheet 2, which has an overall length less than the second inner sheet 5, which has an overall length less than the innermost sheet 6, such that when assembled the first panels form a first staggered edge and each of the fourth panels form a second staggered edge. Additional inner sheets 3 and 4 are also sized such that their lengths are sized progressively smaller from the outermost of these to the innermost of these. When folded, and arranged as herein described, this results in the map shown in FIGS. 5 and 6—shown without a cover—where a first staggered edge 55 and a second staggered edge 60 are provided, one visible from the top side of the map, and the other from the bottom side of the map. This way, as pages of the map are turned past the middle page of the map, a staggered edge is always visible from the page being viewed. This arrangement, also allows for more staggered edges as compared to prior art maps, where such staggered edges are present on one side of the map only, and therefore occupy more space on the overall maps.

The staggered edges are used to present grid reference indicia 30, 50 as illustrated in FIGS. 1 and 2. The grid reference indicia 30, 50 are preferably ordered numerals that can be used to identify portions of the grid on any particular map page. The number of gird indicia that can effectively be used is greatly enhanced by way of this invention as well.

Finally, the map may include a protective cover portion 15 shown in FIGS. 1 and 2 formed from a generally stiffer material than the rest of the map. Referring particularly to FIG. 2, a pocket portion 45 is illustrated, which when assembled, will be attached along top 15*a* and bottom 15*b* edges of the cover portion 15, such that a pocket is formed between pocket portion 45 and the cover portion 15. The pocket 45 enables the map to be folded in half and the end 17, furthest away from the pocket can be folded into, and held within the pocket. This permits the map to kept closed at all times when not in use, and held in a secure fashion that minimizes wear and/or damage to any individual pages.

As shown in FIG. 1, the protective cover 15 preferably surrounds the outermost sheet 1 and extends over each of the staggered portions of the map so that in embodiments where the cover 15 is used, the staggered portions are always protected. Furthermore, the cover portion may have printed thereon a general top-level map, for example of a particular downtown core, a representative example of San Francisco is shown in FIG. 1. Each of the boxes may relate to one of the additional pages in the map, and user would then be able to turn directly to that page, using the series of indicia 30.

Figure 6:
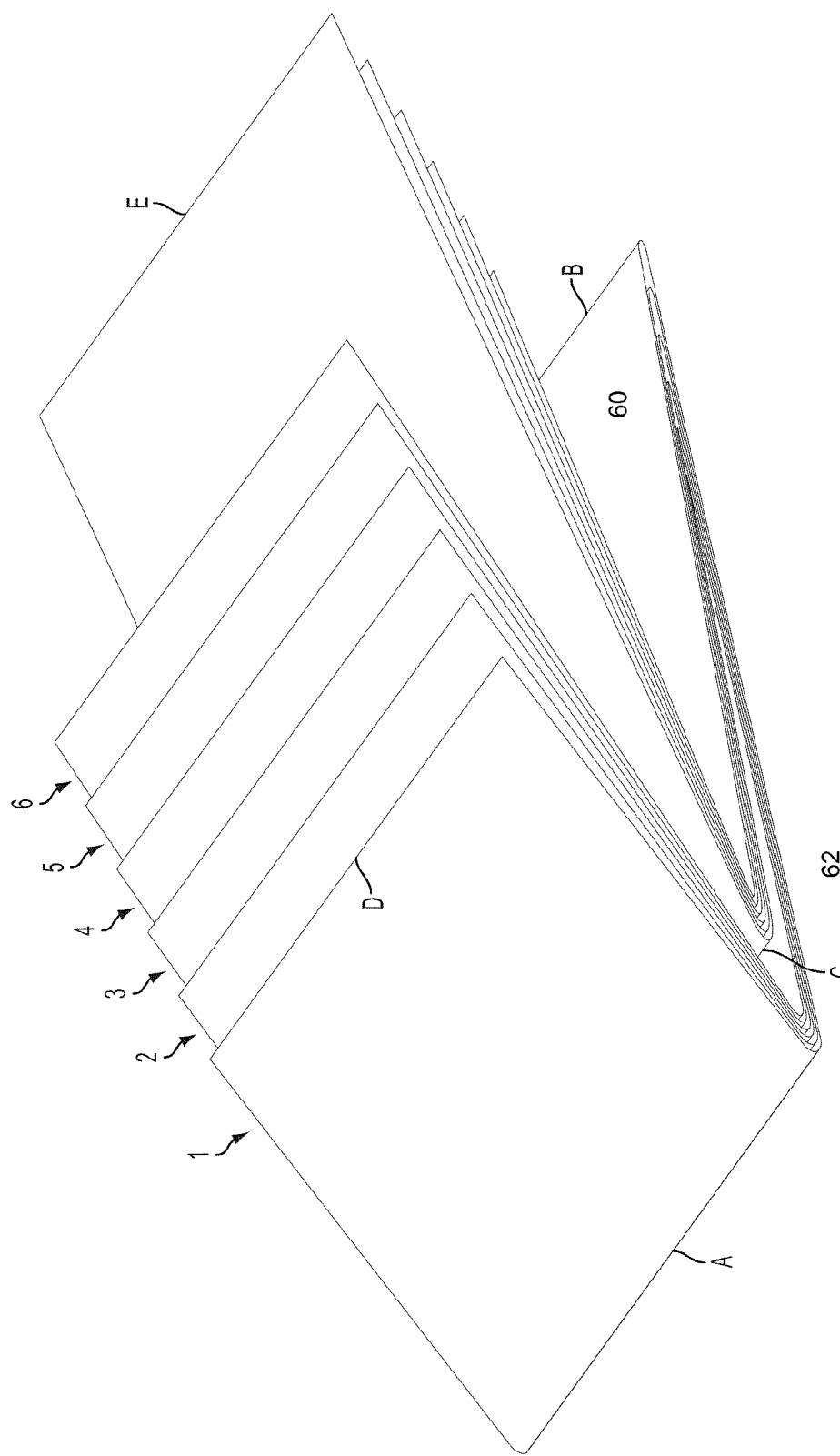
FIG. 6 is a perspective view of the map of FIG. 5.

As will also be appreciated with reference to FIG. 6, any of the surfaces M may have map material shown thereon. Note that FIG. 6 shows the underside of the view of FIG. 1, with the cover removed. The top-level map may be shown on the cover, or shown on the surface 60. It will be appreciated by those skilled in the art that any of the panels on any of the sheets may have map material illustrated thereon. Furthermore, a removable index or directory may be contained within the map itself, at section 62. Stitching or binding may be provided along edge B, shown in FIG. 6.

A method for assembling a map as herein described includes the steps of providing a plurality of sheets as described above, and best illustrated in FIG. 3. The plurality of sheets include an outermost sheet and an innermost sheet; and at least a first inner sheet and a second inner sheet positioned between the outermost sheet and the innermost sheet. Additional inner sheets are also contemplated.

The method includes folding each of the plurality of sheets along first A, second B and third C fold lines such that each of the plurality of sheets includes four panels; the first panel DA defined by a first side edge D and the first fold line A, the second panel AB defined by the first fold line A and the second fold line B, the third panel BC defined by the second fold line B and the third fold line C, and the fourth panel CE defined by the third fold line C and a second side edge E.

Next, the method includes folding each sheet along the second fold line B such that the third panel BC is positioned atop the second panel AB with the third fold line C proximate the first fold line A. Then, folding each sheet along the third fold line C such that the fourth panel CE is positioned atop the third panel BC and the first panel DA positioned atop the fourth panel CE.

The outermost sheet has an overall length less than the first inner sheet, which has an overall length less than the second inner sheet, which has an overall length less than the innermost sheet, such that when assembled the first panels form a first staggered edge and each of the fourth panels form a second staggered edge.

Various materials may be used to manufacture the map and the cover, as will be known to a person skilled in the art. Finally, the map may be assembled by hand or tooling can be provided to complete the folds as described. The invention is not limited to manual or automated methods. In addition, it is contemplated that each sheet will have end portions thereof reinforced with added material so that the pages of the map are not damaged when turned.

Pictorial sections of the map may be illustrated on any of the surfaces or panels of the sheets without limitation. Each of the panels as herein described, on both sides thereof, are useable for showing portions of the map.

Various modifications and alterations of the invention will be apparent to one skilled in the art, and the invention is not to be considered limited by the preferred embodiments herein described. Rather, the invention is defined by the claims following this specification.

I claim:

1. A map comprising
a plurality of sheets having map pictorial sections printed on each sheet; said plurality of sheets including an outermost sheet and an innermost sheet; and at least a first inner sheet and a second inner sheet positioned between said outermost sheet and said innermost sheet, said first inner sheet positioned between said outermost sheet and said second inner sheet;
each of said plurality of sheets having first, second and third fold lines such that each of said plurality of sheets includes four panels; said first panel defined by a first side edge and said first fold line, said second panel defined by said first fold line and said second fold line, said third panel defined by said second fold line and said third fold line, and said fourth panel defined by said third fold line and a second side edge;
wherein each said sheet is folded along said second fold line such that said third panel is positioned atop said second panel with said third fold line proximate said first fold line; said fourth panel positioned atop said third panel as said sheet is folded along said third fold line; said first panel positioned atop said fourth panel; and wherein said outermost sheet has an overall length less than said first inner sheet, which has an overall length less than said second inner sheet, which has an overall length less than said innermost sheet, such that when assembled said first panels form a first staggered edge and each of said fourth panels form a second staggered edge.

2. The map according to claim 1, wherein each said second and third panels are substantially identical in size.

3. The map according to claim 1, wherein said first staggered edge is staggered such that the first edge and a portion of the sheet proximate thereto of each of said plurality of sheets faces towards a top portion of said map, and is visible from the top.

4. The map according to claim 3, wherein each said visible first edge and said portion of the sheet proximate thereto contains grid reference indicia.

5. The map according to claim 1, wherein said second staggered edge is staggered such that the second edge and another portion of the sheet proximate thereto of each of said plurality of sheets faces towards a bottom portion of said map and is visible from the bottom.

6. The map according to claim 5, wherein each said visible second edge and said another portion of the sheet proximate thereto contains grid reference indicia.

7. The map according to claim 1, further including a protective cover surrounding said outermost sheet, and extending over each of said staggered edge portions.

8. The map according to claim 7, wherein said protective cover further includes a pocket portion into which said map can be folded in half and secured in a closed manner.

9. The method according to claim 7, wherein said protective cover further includes a pocket portion into which said map can be folded in half and secured in a closed manner.

10. A method for assembling a map comprising
  providing a plurality of sheets having map pictorial sections printed on each sheet; said plurality of sheets including an outermost sheet and an innermost sheet; and at least a first inner sheet and a second inner sheet positioned between said outermost sheet and said innermost sheet, said first inner sheet positioned between said outermost sheet and said second inner sheet;
  folding each of said plurality of sheets along first, second and third fold lines such that each of said plurality of sheets includes four panels; said first panel defined by a first side edge and said first fold line, said second panel defined by said first fold line and said second fold line, said third panel defined by said second fold line and said third fold line, and said fourth panel defined by said third fold line and a second side edge;
  folding each said sheet along said second fold line such that said third panel is positioned atop said second panel with said third fold line proximate said first fold line;
  folding each sheet along said third fold line such that said fourth panel positioned atop said third panel and said first panel positioned atop said fourth panel;
  wherein said outermost sheet has an overall length less than said first inner sheet, which has an overall length less than said second inner sheet, which has an overall length less than said innermost sheet, such that when assembled said first panels form a first staggered edge and each of said fourth panels form a second staggered edge.

11. The method according to claim 10, wherein each said second and third panels are substantially identical in size.

12. The method according to claim 10, wherein said first staggered edge is staggered such that the first edge and a portion of the sheet proximate thereto of each of said plurality of sheets faces towards a top portion of said map, and is visible from the top.

13. The method according to claim 10, wherein said second staggered edge is staggered such that the second edge and another portion of the sheet proximate thereto of each of said plurality of sheets faces towards a bottom portion of said map and is visible from the bottom.

14. The method according to claim 13, wherein each said visible first edge and said portion of the sheet proximate thereto contains grid reference indicia.

15. The method according to claim 14, wherein each said visible second edge and said another portion of the sheet proximate thereto contains grid reference indicia.

16. The method according to claim 10, further comprising providing a protective cover surrounding said outermost sheet, and extending over each of said staggered edge portions.

* * * * *